United States Patent [19]

Gilbert

[11] Patent Number: 4,904,074
[45] Date of Patent: Feb. 27, 1990

[54] BREAKAWAY MIRROR RESET

[75] Inventor: Robert Gilbert, Lonsdale, Australia

[73] Assignee: Britax Rainsfords Pty. Ltd., Lonsdale, Australia

[21] Appl. No.: 361,420

[22] Filed: Jun. 5, 1989

[30] Foreign Application Priority Data

Jun. 17, 1988 [AU] Australia ................. PI8823

[51] Int. Cl.⁴ .................................. G02B 5/08
[52] U.S. Cl. ...................... 350/635; 350/604; 350/632; 248/549
[58] Field of Search ............... 350/604, 605, 631, 632, 350/635; 248/548, 549, 900

[56] References Cited

U.S. PATENT DOCUMENTS

| | | | |
|---|---|---|---|
| 4,357,076 | 11/1982 | Manzoni | 350/635 |
| 4,469,406 | 9/1984 | Mettlehauser | 350/635 |
| 4,636,045 | 1/1987 | Sukoki | 350/632 |
| 4,660,944 | 4/1987 | Suzuki et al. | 350/632 |
| 4,783,161 | 11/1988 | Shamoto | 350/635 |
| 4,828,215 | 5/1989 | Mittlehauser | 350/635 |
| 4,836,491 | 6/1989 | Fimeri | 248/549 |

Primary Examiner—Bruce Y. Arnold
Assistant Examiner—Jay Patrick Ryan
Attorney, Agent, or Firm—Klauber & Jackson

[57] ABSTRACT

A break-away mirror is provided with an extensible resilient tension member (26) coupled to the pivoted assembly (11) of the mirror (10) and also coupled to a head (21) on the outer end of a tilt control lever (19), the tension member extending into the pivoted assembly from the head, and being arranged to guide the head (21) back into its track (22) after it has been displaced therefrom by break-away or other forces.

6 Claims, 2 Drawing Sheets

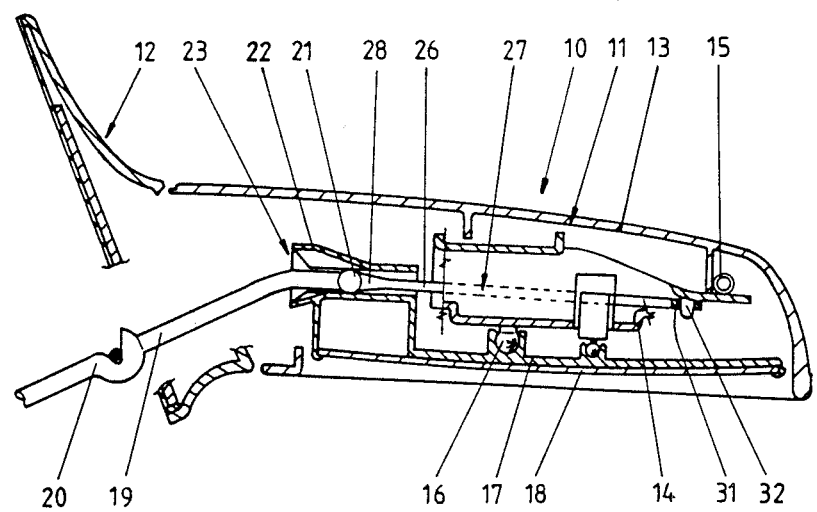
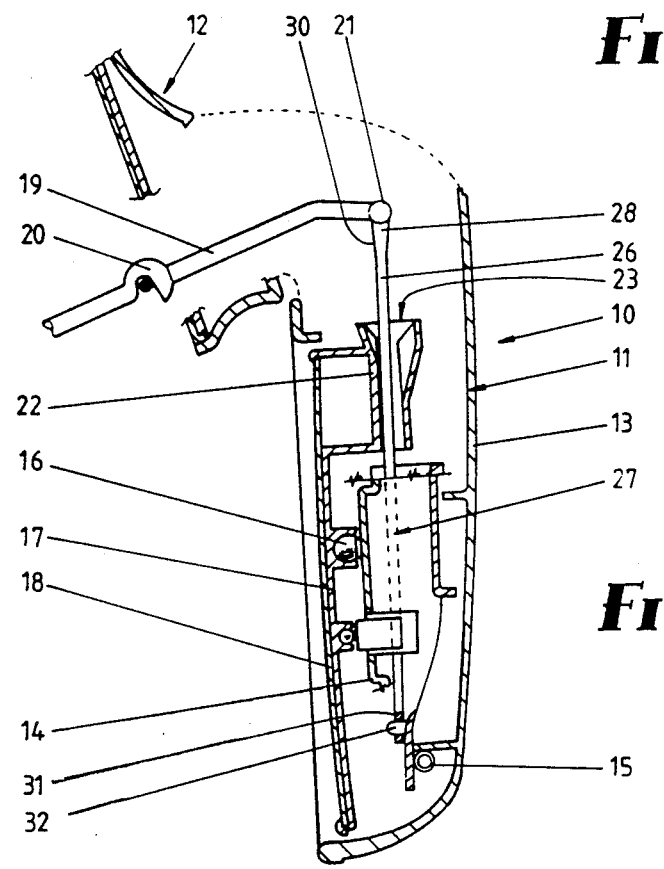
FIG 3
FIG 4

BREAKAWAY MIRROR RESET

This invention relates to a device which will assist in the resetting of a mirror of the so-called "break-away" type carried on the exterior of a motor vehicle.

BACKGROUND OF THE INVENTION

It is necessary for a motor vehicle mirror to hinge either forwardly or rearwardly if attached to the exterior of a vehicle, for safety reasons, and such a facility is mandatory in some countries.

This invention is applicable to a "break-away" mirror assembly of the type having a mounting base, a pivoted assembly pivoted thereto to allow displacement of the pivoted assembly both forwardly and rearwardly, a mirror backing plate, swivel mounting means mounting the mirror backing plate within the pivoted assembly, a mirror carried by the mirror backing plate, a tilt control lever pivoted with respect to the mounting base and having an outer end so engaging track surfaces fixed with respect to the mirror backing plate that manipulation of the lever can tilt the backing plate.

Reference can be made to the Australian Patent Application 15542/88 entitled "Breakaway Mirror Spring Means", being a former application of the applicant herein. In that application, a break-away rear vision mirror assembly of the above type was claimed, and was primarily characterised by walls of a spring track of general "U" shape and a spring contained within the spring track, the spring having two ends extending from the spring track and coupled to the mounting base, and an intermediate portion bearing against the spring track walls to return the pivoted assembly to a useable position after the displacement either forwardly or rearwardly.

In order to effect adjustment laterally and vertically of the mirror, the tilt control lever extended into the pivoted assembly of the mirror and terminated at its outer end in a "T" head which engaged walls of a channel track. Upon break-away occurring, the "T" head would remain in the channel track so that after break-away had occurred, the elongate spring would return the pivoted assembly to its normal position, with the "T" head in position.

In most instances the arrangement described and claimed in that application is suitable without modification. However vehicles vary and there are some vehicles wherein it is not feasible for the channel track to be of sufficient length to retain the "T" head for full break-away of the pivoted assembly in both directions, and re-insertion is sometimes difficult to achieve by a person who is not familiar with the details of construction.

The main object of this invention is to provide an improvement for the break-away mirror reset for those instances wherein the outer end of a tilt control lever necessarily leaves a channel track of a pivoted assembly of a break-away mirror, upon full break-away occurring.

BRIEF SUMMARY OF THE INVENTION

To achieve this object, in one embodiment of this invention, a break-away mirror of the type defined above is provided with an extensible resilient tension member coupled to the pivoted assembly and also coupled to a head on the outer end of a tilt control lever, the tension member extending into the pivoted assembly from the head, and being arranged to guide the head back into its track after it has been displaced therefrom by break-away or other forces.

More specifically, the invention consists of a mounting base, a pivoted assembly pivoted thereto to allow displacement of the pivoted assembly both forwardly and rearwardly, a mirror backing plate, swivel mounting means mounting the mirror backing plate within the pivoted assembly, a mirror carried by the mirror backing plate, a tilt control lever pivoted with respect to the mounting base and having an outer end so engaging track surfaces fixed with respect to the mirror backing plate that manipulation of the lever can tilt the backing plate, and reset means comprising a head on the outer end of the tilt control lever which disengages from the track surfaces upon said displacement, an extensible resilient tension member, first coupling means connecting an inner end of the tension member to the head, further coupling means connecting an outer end of the tension member to the pivoted assembly, and guide surfaces on the pivoted assembly so located as to guide the head back into engagement with the track surfaces upon reset of the pivoted assembly from a displacement position.

The tension member can take any one of a number of forms, and for example can be a spiral spring, in some instances surrounded by a sleeve for portion of its length, but according to a preferred embodiment the tension member is a moulding of elastomeric material.

BRIEF DESCRIPTION OF THE DRAWINGS

An embodiment of the invention is described hereunder in some detail with reference to and is illustrated in the accompanying sketches in which:

FIG. 3 is a plan section taken on line 3—3 of FIG. 1; and

FIG. 4 is a view similar to FIG. 3 but showing the pivoted assembly when displaced rearwardly.

Figures 1, 2:
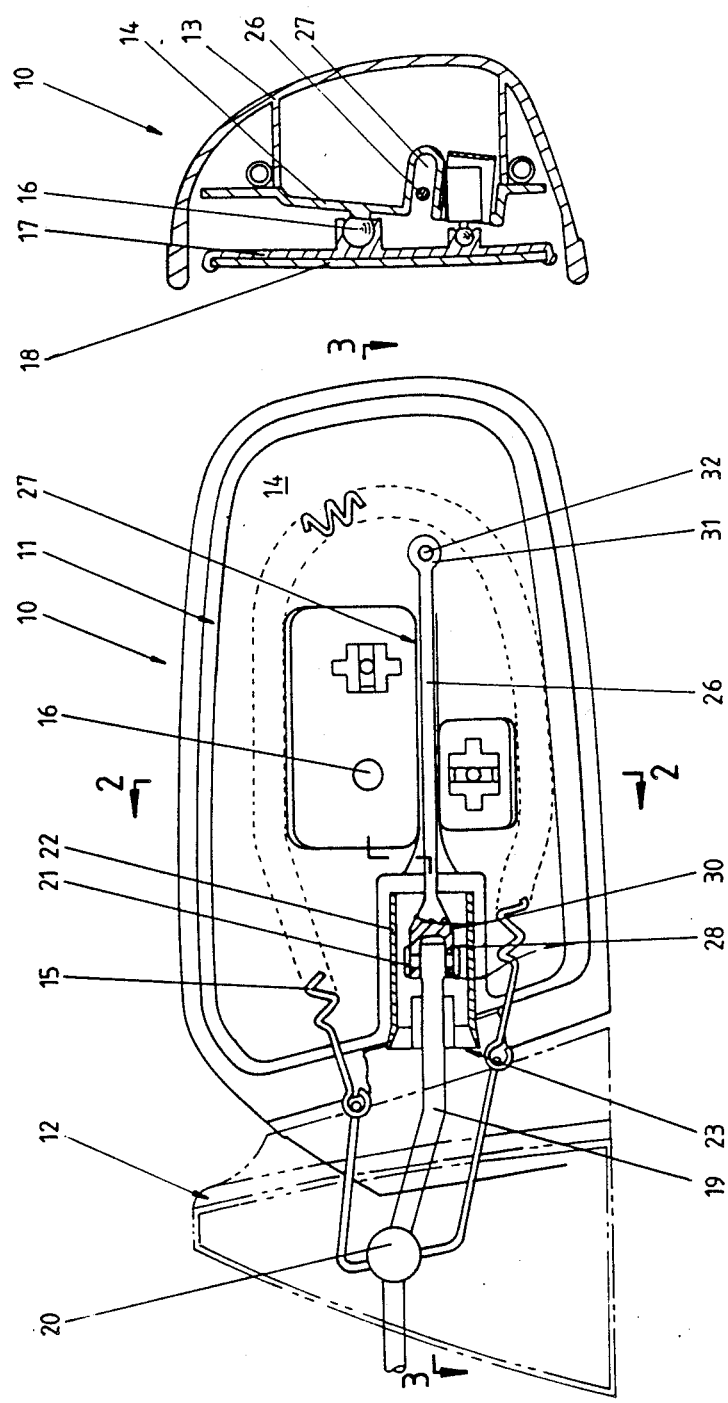
FIG. 1 is a rear elevation of a mirror which however omits the mirror and backing plate for the sake of clarity.
FIG. 2 is an end elevational section taken on line 2—2 of FIG. 1.

In this embodiment, a rear vision mirror assembly 10 comprises a pivoted assembly 11 which is pivoted for "break-away" to a mounting base 12. The pivoted assembly 11 comprises a cover 13 which carries on it a swivel mounting plate 14, the swivel mounting plate 14 supporting a spring 15 which is of general "U" shape. The swivel mounting plate 14 has a rearwardly projecting ball 16 to which is mounted a mirror backing plate 17 (not shown in FIG. 1), the mirror backing plate 17 carrying a glass mirror 18.

The mirror needs adjustment laterally and vertically to suit different drivers, and this is achieved by means of a tilt control lever 19 which is ball mounted at 20 to the mounting base 12, the inner end of the tilt control lever 19 terminating in a "T" head 21 contained in a narrow mouth channel 22, the surfaces of which comprise track surfaces which guide the "T" head 21, but as illustrated the channel 22 is necessarily short in length because of the mounting requirements for a vehicle. Thus upon break-away which may occur for example by impact of the pivoted assembly 11, the "T" head 21 leaves the channel 22 as illustrated in FIG. 4, and notwithstanding walls of the mirror mounting plate providing guide surfaces which define a generous "lead-in" 23 at the mouth of the channel, can be difficult to re-insert by those unfamiliar with the mechanics of the mirror assembly.

As said above, the main object of this invention is to provide means whereby re-insertion of the "T" head will be facilitated, and this is achieved in this invention by an extensible resilient tension member 26. The tension member 26 is movable within a deep channel 27 in the swivel mounting plate 14, and terminates at its inner end in a pair of loops 28 which surround the "T" head 21. The outer walls of the head 28 curve inwardly towards one another to provide ramp surfaces 30 as best seen in FIG. 1, and these assist in guiding the tension member 26 into the channel 27.

The outer end of the tension member 26 is an apertured lug 31 which comprises further coupling means, engaging over an anchor spigot 32, and the intermediate portion of member 26 is contained within a recess in the swivel mounting plate 14, surfaces of which retain it against rotation so that the tension member 26 will tend to return the "T" head 21 of the tilt control level 19 back into its channel 22 without there being sufficient rotational displacement to inhibit entry into the lead-in mouth 23 of the channel 22.

The material used for the tension member 26 can be any one of a number of elastomers, one particularly suitable elastomer being a polyurethane which has excellent characteristics of resilience, long life and resistance to excessive heat and cold.

A consideration of the above embodiment will indicate that the invention is basically very simple but nevertheless results in a considerable improvement in the construction and operation of certain rear vision mirrors of the break-away type. Many variations of construction can of course occur within the invention, and for example the swivel mounting plate can be portion of the cover moulding. In lieu of an elastomeric moulding for the tension member 26 can be made of a wire spring, the "T" head 21 of the tilt control lever can be of a different shape and in some embodiments it need not be contained within channel walls as described, but these and similar variations in construction will be seen to lie within the invention.

I claim:

1. Reset means in a "break-away" mirror assembly of the type having a mounting base, a pivoted assembly pivoted thereto to allow displacement of the pivoted assembly both forwardly and rearwardly, a mirror backing plate, swivel mounting means mounting the mirror backing plate within the pivoted assembly, a mirror carried by the mirror backing plate, a tilt control lever pivoted with respect to the mounting base and having an outer end so engaging track surfaces fixed with respect to the mirror backing plate that manipulation of the lever can tilt the backing plate, the reset means comprising a head on the outer end of the tilt control lever which disengages from the track surfaces upon said displacement, an extensible resilient tension member, first coupling means connecting an inner end of the tension member to the head, further coupling means connecting an outer end of the tension member to the pivoted assembly, and guide surfaces of the pivoted assembly so located as to guide the head back into engagement with the track surfaces upon reset of the pivoted assembly from a displacement position.

2. Reset means according to claim 1 wherein the head on the outer end of the tilt control lever is a "T" head, said first coupling means comprising surfaces on the inner end of the tension member which engage with "T" head.

3. Reset means according to claim 1 or claim 2 wherein said further coupling means comprises an apertured head on the outer end of the tension member engaging an anchor surface on the pivoted assembly.

4. Reset means according to claim 1 wherein said pivoted assembly comprises a swivel mounting plate, a mirror backing plate, a swivel joint between those said plates, walls on said mirror mounting plate providing said guide surfaces and said track surfaces, said first coupling means comprising a pair of loops on the tension member which surround the tilt control lever head, said further coupling means comprising an apertured lug on the outer end of the tension member which engages an anchor spigot in the swivel mounting plate.

5. Reset means according to claim 4 wherein said guide surfaces diverge from ends of said track surfaces.

6. Reset means according to claim 4 further comprising walls on the swivel mounting plate defining a channel which opens to said recess, said extensible resilient tension member extending through said channel.

* * * * *